United States Patent Office 3,428,787
Patented Feb. 18, 1969

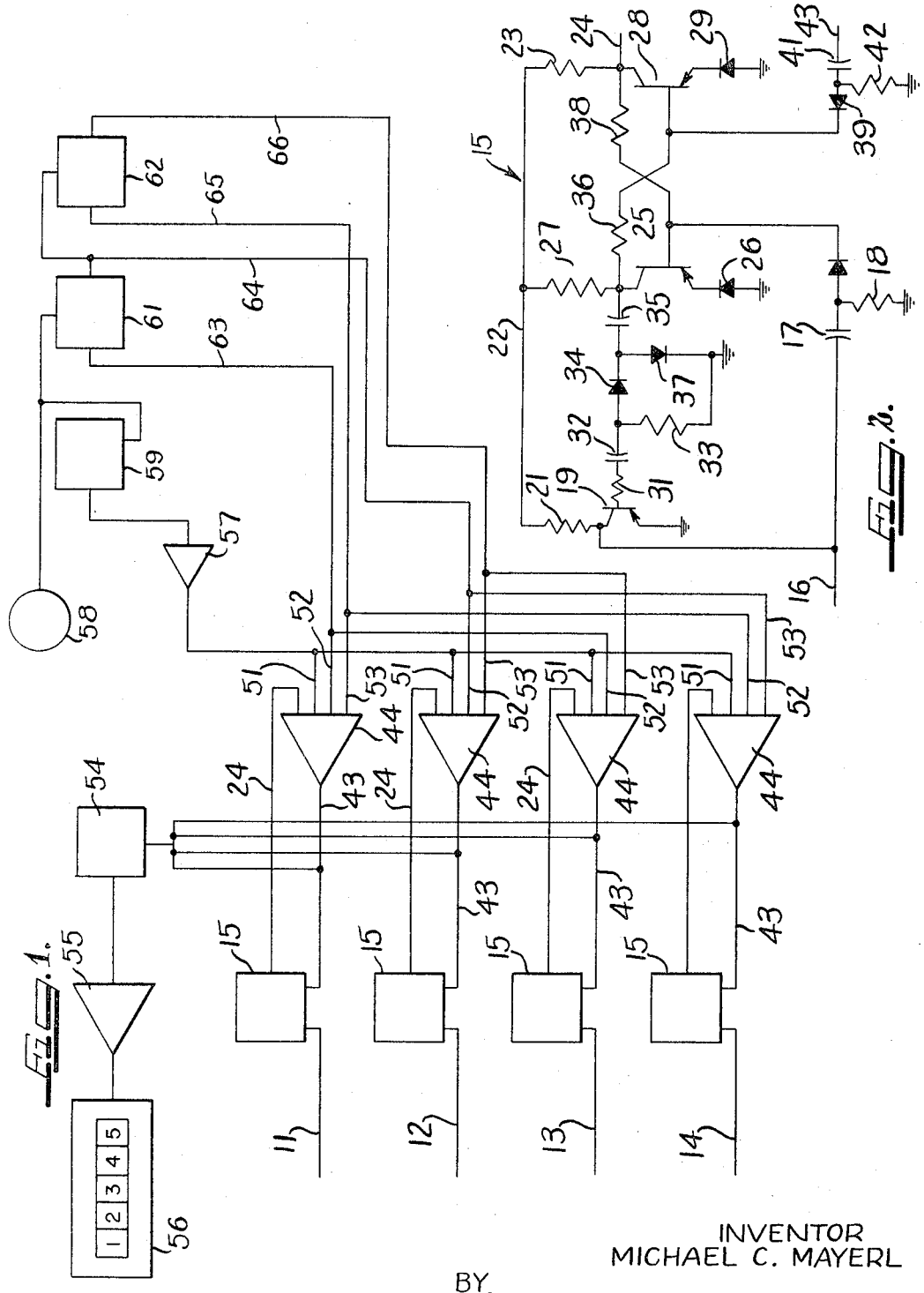

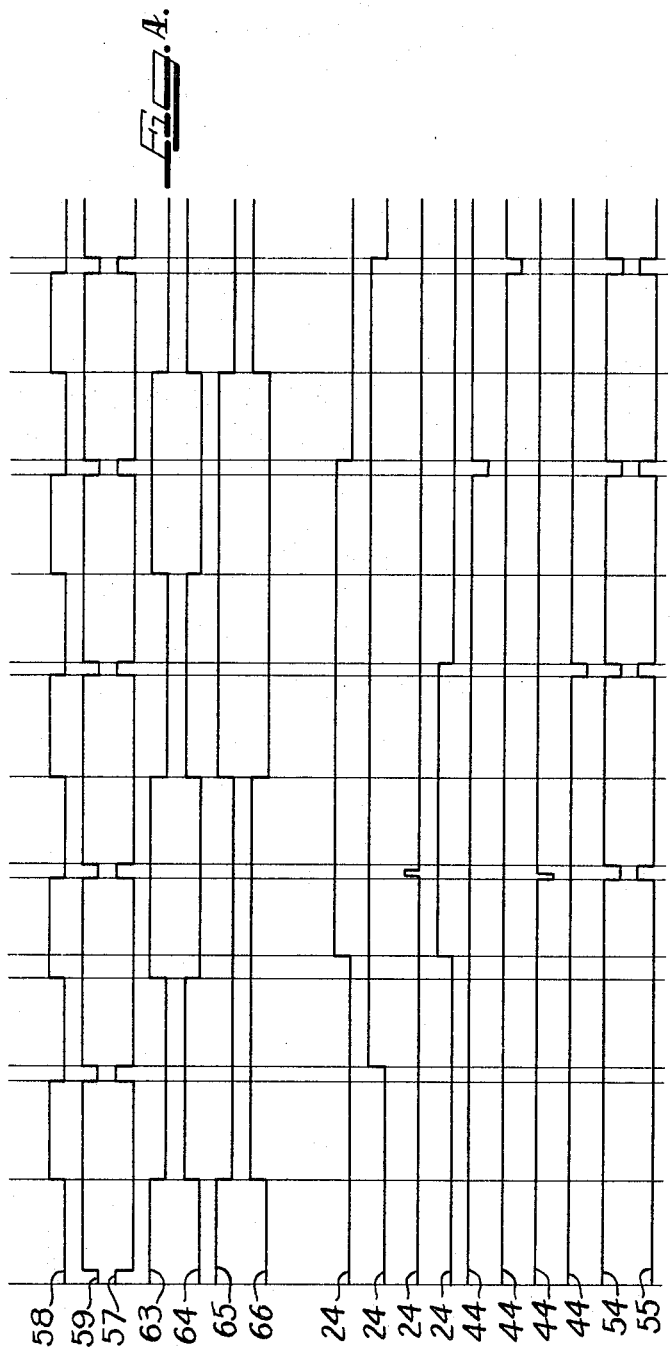
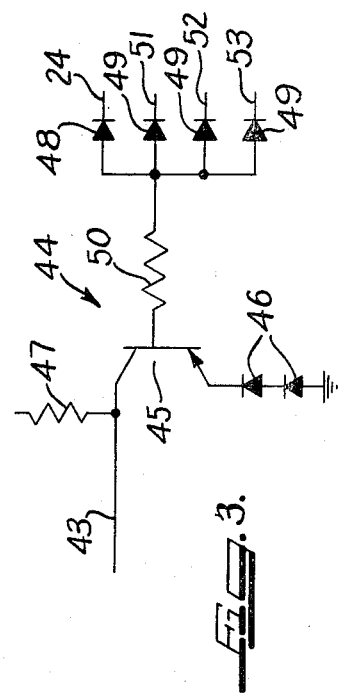

3,428,787
MULTIPLE CHANNEL INDICATING APPARATUS
Michael C. Mayerl, Twin Lakes, Wis., assignor to Mangood Corporation, a corporation of Illinois
Filed Oct. 20, 1965, Ser. No. 498,341
U.S. Cl. 235—92                                           1 Claim
Int. Cl. G06f 7/38; G06g 7/00

ABSTRACT OF THE DISCLOSURE

An indicating apparatus for multiple channels, each having individual memory units which are successively scanned by a timing mechanism for transmittal of information to a counting apparatus. The memory units include time-delay mechanisms to prevent accidental transmission due to contact bouncing or other disturbances in the system. A detector unit for each memory unit actuates the counting apparatus upon simultaneous reception of a first control signal from a respective memory unit, and second and third control signals from the timing mechanism.

---

This invention relates to multiple channel indicating apparatus and, more particularly, to apparatus for counting a total number of pulses or similar signals from a plurality of separate signalling channels.

There are numerous instances in which it is desired to count the total number of occurrences in a plurality of separate mechanisms or channels. For example, in counting traffic in multiple lane highways, it is preferable to detect the vehicles travelling in individual lanes to avoid false counts due to simultaneous movements of vehicles in the different lanes and to indicate the total count in all of the lanes. Apparatus heretofore available has not been capable of accomplishing this result.

It is, accordingly, one of the objects of the present invention to provide multiple channel indicating apparatus which will receive and count pulse signals received from a plurality of separate signals.

Another object is to provide multiple channel indicating apparatus in which the pulses received in each of the channels are stored in individual memory units and the memory units are successively scanned by timing mechanism to transmit the information stored in the several memory units to counting apparatus.

According to a feature of the invention the memory units include time delay mechanisms to prevent accidental transmission of pulses to the counting apparatus due to contact bouncing or other disturbances in the system.

The above and other objects and features of the invention will be more readily apparent from the following description when read in connection with the accompanying drawings in which:

FIGURE 1 is a circuit diagram of a multiple channel indicating apparatus embodying the invention.

FIGURE 2 is a circuit diagram of a portion of the apparatus.

FIGURE 3 is a similar diagram of another portion of the apparatus; and

FIGURE 4 is an operating chart indicating typical operation of the system.

The apparatus as shown in FIGURE 1 is adapted to indicate the total count of pulses or similar signals received from four different channels 11, 12, 13 and 14 although it will be understood that more or less separate channels could supply information to the same apparatus providing that the apparatus was expended to accommodate the existing number of channels. Each of the channels receives digital counts in the form of short electrical pulses from sensing devices which sense the occurrence of events which are to be indicated. For example, each of the channels may be connected to a pickup device mounted in a separate lane of a multiple lane highway to produce a pulse whenever a vehicle passes the counting point in the particular lane.

Each of the channels is connected to a memory unit 15, all of which are identical and which function in the same way. A detailed circuit diagram of one of the memory units is shown in FIGURE 2. As there indicated, the pulse from one of the channels is received in the form of a short positive electrical impulse on a line 16 which is connected to ground through a capacitor 17 and resistor 18. The line 16 is also connected to the collector electrode of a transistor 19 whose emitter is connected to ground. The collector of the transistor is connected through a resistor 21 to a line 22 which connects through a resistor 23 to an output line 24 through which a pulse stored in the memory unit 15 is transmitted to the remainder of the system.

A second transistor 25 has its emitter connected through a rectifier 26 to ground and its collector connected through a resistor 27 to line 15. Third transistor 28 similarly has its emitter connected through a rectifier 29 to ground and its collector connected directly to the line 24 and through the resistor 23 to the line 15. The base of the transistor 19 is connected through a resistor 31 and capacitor 32 which form a time delay circuit and through a resistor 33 to ground. The time delay circuit is also connected through a rectifier 34 and capacitor 35 to the collector of transistor 36 and through a resistor 36 to the base of the transistor 28. A point between the rectifier 34 and capacitor 35 is connected to ground through a rectifier 37. The collector of transistor 28 is connected through resistor 38 to the base of transistor 25. The base of transistor 28 is also connected through a rectifier 39 and capacitor 41, the point between which is grounded through resistor 42, to a line 43 which supplies a reset signal to the memory unit.

In operation of this circuit the transistor 25 is normally conducting and the transistors 19 and 28 are normally nonconducting. The line 22 is connected to a negative voltage source so that when a positive pulse appears on line 16 it will trigger the transistor 25 to non-conduction. This will produce a negative pulse on the base of transistor 19 to turn it on with the time delay circuit 31, 32 holding transistor 19 in the conducting state for a specified time thus preventing another input pulse, due to contact bounce or similar transients, from appearing on line 16 during this time. At the same time, a negative voltage will be transmitted to the base of the transistor 28 to turn it on so that a positive voltage will be produced at the output line 24. This voltage will remain with the circuit in the trigger condition described until a positive pulse is supplied to the transistor 28 through the line 43, at which time the circuit will be reset in condition to receive another pulse from the input line 16 to be stored.

As shown in FIGURE 1, the lines 24 and 43 are connected to detector circuits indicated generally at 44 and which are shown in detail in FIGURE 3. This unit, as best seen in FIGURE 3, comprises a transistor 45 whose emitter is connected to ground through rectifiers 46 and whose collector is connected to the line 43 as well as to a source of negative voltage through a resistor 47.

The base of transistor 45 is connected through a resistor 50 and a rectifier 48 to the line 24 and through similar rectifiers 49 to lines 51, 52 and 53. A negative voltage is supplied to the base of transistor 45 at all times except when a pulse is stored in the corresponding memory unit at which the line 24 is connected. The transistor 45 is therefore biased to conduction and will remain conductive until all of the several lines 24, 51, 52 and 53 are at ground or positive voltage. At this time the transistor 45 will be non-conductive to produce a negative signal on the line 43 which will be transmitted to a circuit indicated at 54 in FIGURE 1 which transmits pulses through an amplifier 55 to a counter indicated at 56 which counts and records the pulses. While the counter has been illustrated purely diagrammatically, it will be understood that this could be any desired type of counting and recording mechanism which will record pulses received by it either in digital or coded form for subsequent uses. When transistor 45 returns to a conductive state, a positive signal on line 43 will be transmitted to the base of transistor 28 causing transistor 28 to become non-conducting and to reset the memory unit to receive an additional pulse.

As shown in FIGURE 1, the lines 51 of each of the detector circuits 44 are connected to an inverter 57 which periodically supplies positive pulses at ground potential to the detector circuits. The inverter 57 is controlled by a timing mechanism which includes a clock or similar timer 58 supplying pulses at predetermined intervals in the form of square waves to a plurality of monostable multivibrators or flip-flop circuits 59, 61 and 62. The inverter 57 is triggered each time the clock produces an output varying from positive to negative to supply a short pulse to each of the detectors 44 and to provide a signal on the line 51 of each detector at positive or ground potential. The clock 58 similarly controls the flip-flop circuit 61 so that the circuit 61 will produce a negative voltage on an output line 63 therefrom every other time the clock signal goes from negative to positive and will produce a positive voltage on a second output line 64 therefrom every other time the clock signal goes from negative to positive. When there is a negative signal on output line 63, there will be a positive signal on output line 64. The flip-flop circuit 62 is controlled by the flip-flop circuit 61 through a connection to the output line 64 therefrom. Each time the voltage on the output line 64 goes from negative to positive the flip-flop circuit 62 will be triggered to produce a negative voltage on its output line 65 and a positive or ground voltage on its output line 66 or the reverse.

The output line 63 from the flip-flop circuit 61 is connected, as shown in FIGURE 1, to the lines 52 of the first and third detector circuits 44. The line 52 of the second detector circuit and line 53 of the fourth detector circuit are connected to the line 64. The line 65 is connected to the line 53 of the first detector circuit 44 and to the line 52 of the fourth detector circuit 44. The line 66 is connected to the line 53 of the second detector circuit and to the line 53 of the third detector circuit.

Operation of the system as a whole will be better understood by reference to FIGURE 4 which shows the change in voltage in the various lines and components plotted against time. The upper curve is the form of a square wave represents the voltage output of the clock 58. The second curve 59 represents the output voltage of the monostable circuit 59. The third curve marked 57 represents the output voltage of the inverter 57. The succeeding four lines marked respectively 63, 64, 65 and 66 represent voltage changes in the corresponding lines in FIGURE 1. The next four lines all marked 24 indicate the voltages in the output lines 24 of the four memory units according to different signal conditions which may exist. The next four lines all marked 44 represent the voltages in the output lines 43 of the four detector circuits. The next line marked 54 represents the output voltage of the circuit 54 which is a monostable circuit. The lower line 55 indicates the condition of the amplifier 55 or of a relay triggered by it. The contacts of the relay may be used to operate any low power counter 56.

From the chart FIGURE 4 it will be seen that the clock produces a square wave output whose time period may be controlled in accordance with the demands of the particular counting installation. In multiple lane traffic counting, for example, the cycle of the clock may be on the order of 80 milliseconds. When a pulse signal has been received by any one of the memory circuits, the voltage in its output line 24 will go positive, but when no signal is present in any one of the memory circuits, its line 24 will be negative. This condition is indicated by the four lines marked 24 in the graph FIGURE 4 in which the appearance of signals to be counted at the memory units is selected more or less at random to indicate different possible conditions. As will be seen from the line 59 on the chart, the monostable circuit 59 is triggered to produce a short negative pulse each time the clock output voltage goes from positive to negative. These pulses are transmitted through inverter 57 to all of the detector circuits 44 and partially conditions them periodically for transmission of signals. The inverter 57 receives the pulses from the monostable circuit 59 and inverts them to transmit short positive pulses corresponding to the negative pulses produced by the monostable 59 to the detector circuits.

The flip-flop circuit 61 is triggered each time the clock voltage goes from negative to positive to produce a negative voltage in the line 63 and a positive voltage in the line 64 and the reverse. Production of a positive voltage from the line 64 to the line 52 of the second detector circuit and the line 53 of the fourth detector circuit partially conditions them for operation. The next time the clock voltage goes from negative to positive the flip-flop circuit 61 is reversed to produce a positive voltage on the lines 52 of the first and third detector circuits to partially condition them for operation.

The flip-flop circuit 62, as shown by the lines 65 and 66, is reversed each time the voltage in line 64 goes from negative to positive similarly to partially condition the detector circuits.

When a pulse to be counted is present in any one of the memory units and when all of the input lines 24, 51, 52 and 53 for that memory circuit simultaneously are at positive or ground potential, the corresponding detector circuit 44 will be tripped to supply a negative pulse on its output line 43. This pulse will be transmitted to the circuit 54 to trigger it so that the amplifier or relay 55 will be tripped to actuate the counting device 56. When detector circuit 44 returns to an off condition, a positive pulse will occur on line 43 to reset the memory unit 15 which is common to that particular detector. Due to the operation of the flip-flop circuits 61 and 62 as well as the circuit 59 under the control of the clock mechanism, it will be seen that the detector circuits 44 are successively scanned to cause them successively to be conditioned for operation. This occurs when the voltages on the lines 51, 52, and 53 for any one of the detector circuits simultaneously are at positive or ground potential and also when there is a positive voltage on the line 24 due to the fact that a count is stored in the corresponding memory circuit. When the detector circuits 44 are successively conditioned for operation by the clock mechanism, there is no possibility of obtaining overlapping counts, and an accurate count will at all times be provided. It will be understood that the scanning interval as determined by the clock is set in accordance with the frequency of the counts received in each channel so that each count from each channel will be accurately recorded. For example, in multiple highway traffic counting, it has been found that the interval of eighty milliseconds, as mentioned above, is sufficiently short so that two vehicles could not cross the same detecting device during a counting period.

While one embodiment of the invention has been shown and described in detail, it will be understood that this is for the purpose of illustration only and is not to be taken as a definition of the scope of the invention, reference being had for this purpose to the appended claim.

What is claimed is:

1. Multiple channel indicating apparatus comprising a plurality of memory units receiving and storing pulses from different channels respectively, timing mechanism producing a series of spaced signals, a plurality of decoder units corresponding and connected respectively to the memory units, the memory units acting when pulses are stored therein to supply first control signals to the decoder units, means controlled by the timing mechanism to supply second control signals to the decoder units in timed sequence, means controlled by the timing mechanism periodically to produce a third control signal which is simultaneously supplied to all of the decoder units and in which the decoder units produce control pulses only in response to simultaneous reception of all three control signals, to produce a counting pulse, and means connected to the decoder units to count the counting pulses.

References Cited

UNITED STATES PATENTS

| 2,978,174 | 4/1961 | Dean | 235—92 |
| 3,268,710 | 8/1966 | Conover | 235—92 |
| 3,344,408 | 9/1967 | Singer | 235—92 |

MAYNARD R. WILBUR, *Primary Examiner.*

G. J. MAIER, *Assistant Examiner.*